3 Sheets—Sheet 1.

F. G. BATES & L. E. HARTMANN.
Mechanism for Operating Doffer-Combs

No. 206,073.      Patented July 16, 1878.

WITNESSES:      INVENTORS,

3 Sheets—Sheet 2

F. G. BATES & L. E. HARTMANN.
Mechanism for Operating Doffer-Combs

No. 206,073. Patented July 16, 1878.

WITNESSES:
Saml. J. VanStavoren
Jos. R. Connolly

INVENTORS.
Francis G. Bates,
Louis E. Hartmann,
By Connolly Bros., ATTORNEYS.

F. G. BATES & L. E. HARTMANN.
Mechanism for Operating Doffer-Combs.
No. 206,073. Patented July 16, 1878.
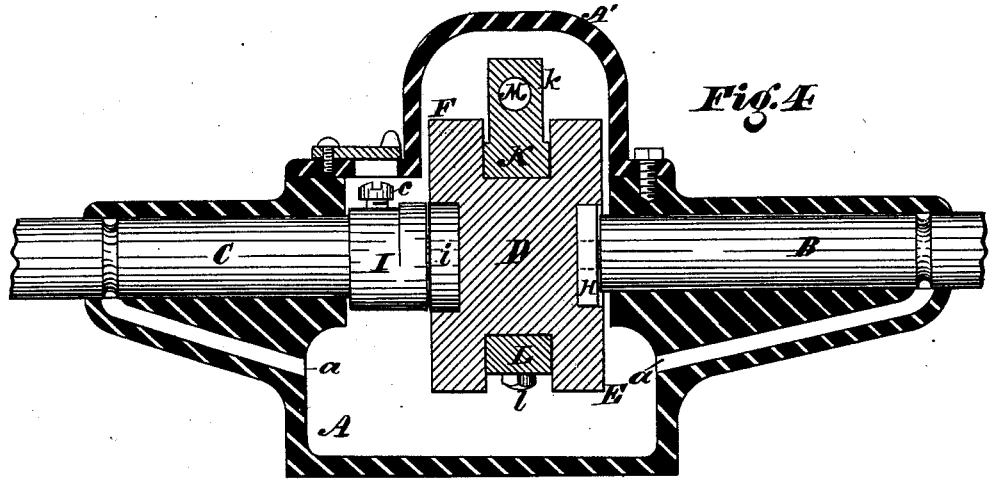
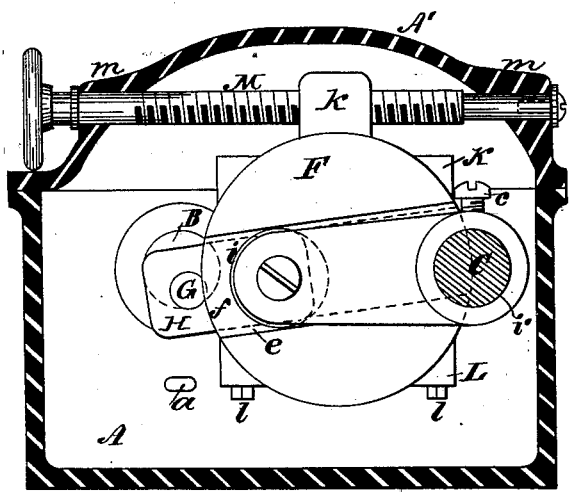
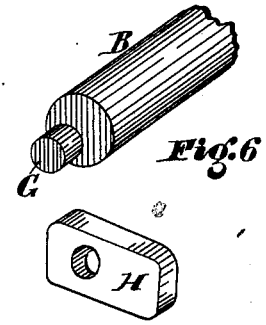
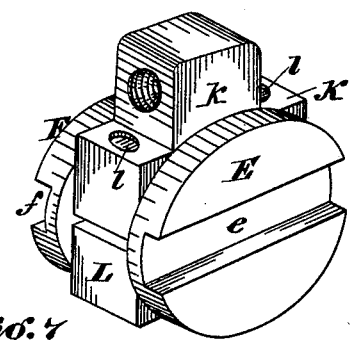

UNITED STATES PATENT OFFICE.

FRANCIS G. BATES, OF SPRINGFIELD, AND LOUIS E. HARTMANN, OF GREENFIELD, MASSACHUSETTS.

IMPROVEMENT IN MECHANISMS FOR OPERATING DOFFER-COMBS.

Specification forming part of Letters Patent No. 206,073, dated July 16, 1878; application filed April 3, 1878.

*To all whom it may concern:*

Be it known that we, FRANCIS G. BATES, of Springfield, in the county of Hampden and State of Massachusetts, and LOUIS E. HARTMANN, of Greenfield, in the county of Franklin and State of Massachusetts, have invented certain new and useful Improvements in Mechanism for Operating Doffer-Combs; and we do hereby declare the following to be a full, clear, and exact description of the invention, such as will enable others skilled in the art to which it pertains to make and use it, reference being had to the accompanying drawings, which form part of this specification, in which—

Figure 1:
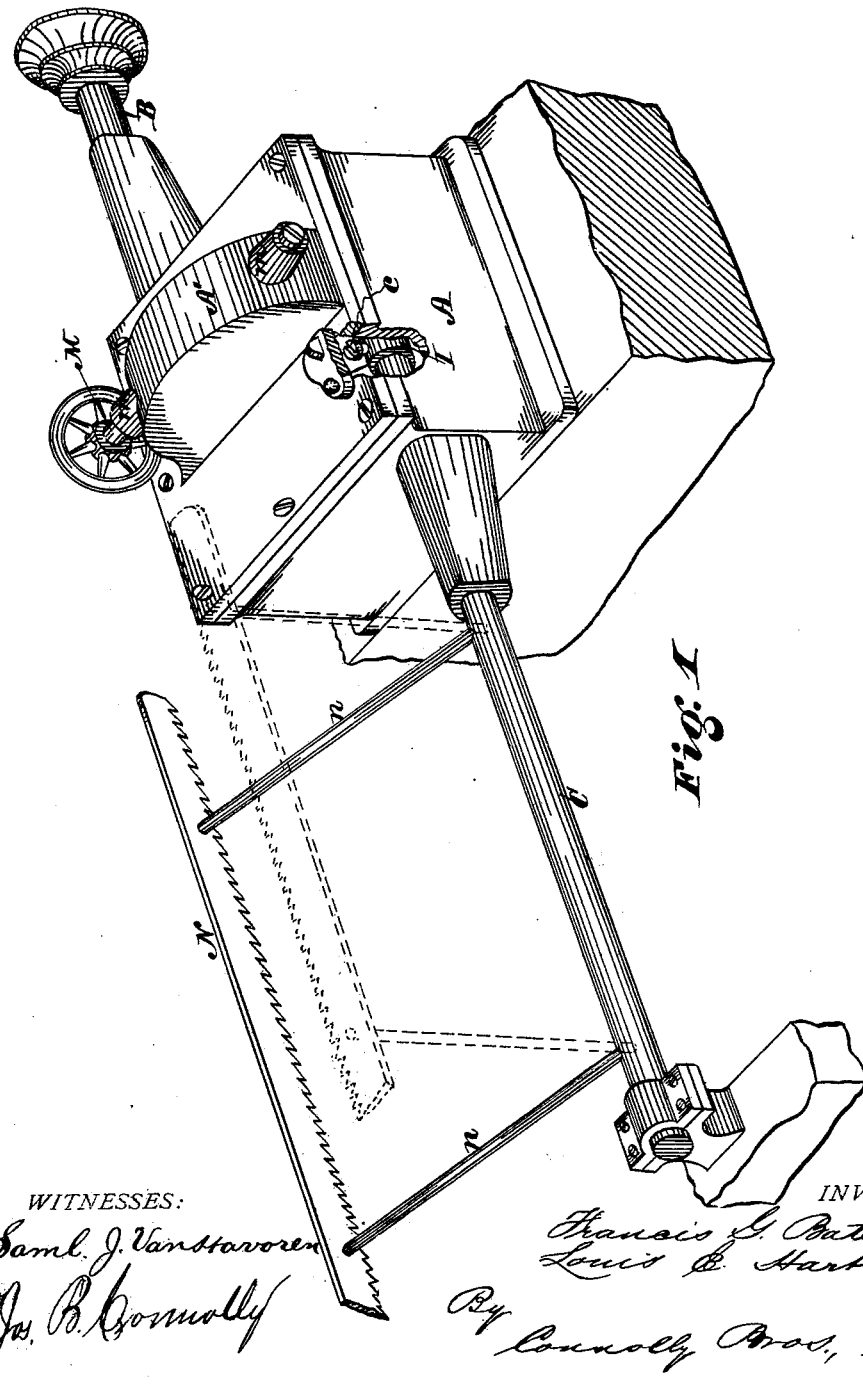
Figure 2:
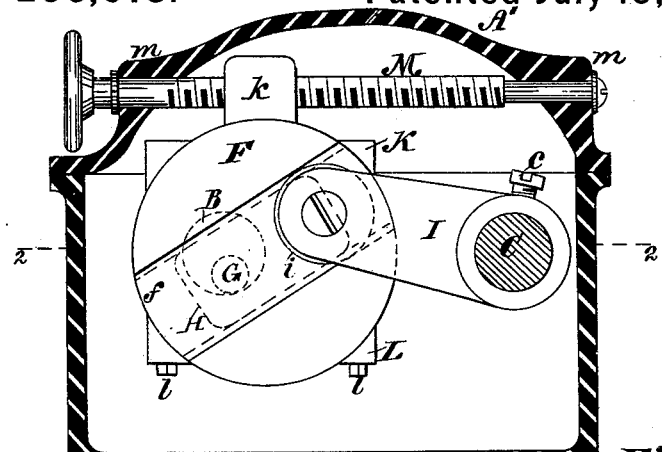
Figure 3:
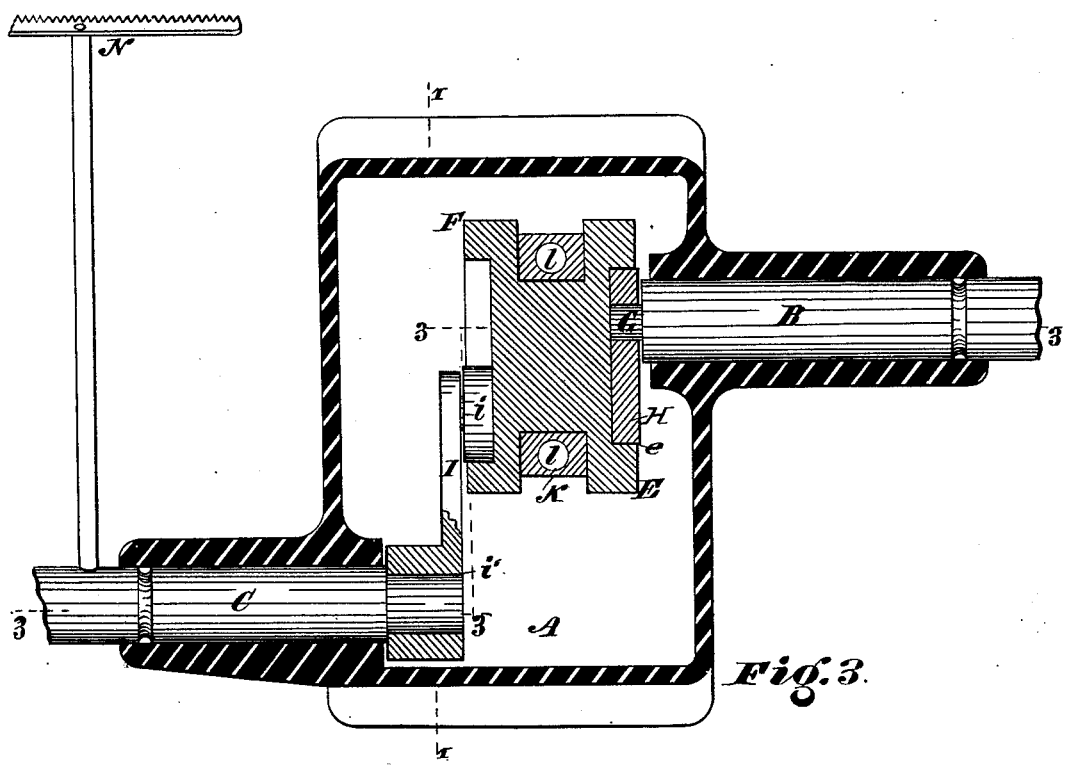

Figure 1 is a perspective of our invention. Figs. 2 and 5 are transverse vertical sections on the line 1 1 in Fig. 3. Fig. 3 is a horizontal section through the line 2 2 in Fig. 2. Fig. 4 is a longitudinal vertical section on the line 3 3 in Fig. 3; and Figs. 6 and 7 are perspective details.

Our invention has for its object to provide a simple, inexpensive, and effective mechanism for operating doffer-combs, said mechanism to comprise means whereby the extent of motion of said combs may be adjusted while running.

Our improvements consist in the peculiar construction, combination, and arrangement of parts, hereinafter fully described, having reference, principally, first, to the means provided for converting the rotary motion of the driving-shaft into the rocking motion of the doffer-comb shaft; second, to the means provided for adjusting the motion of the doffer-comb, so as to lessen or to increase its extent or limit; third, to certain details of construction.

Referring to the accompanying drawing, A designates an oil-tight box, made of a single casting, to which enter, on opposite sides, the driving-shaft B and the doffer-comb shaft C, respectively. D is a short independent shaft, having, at each extremity, heads E and F, respectively, said heads being grooved, as shown, at *e* and *f*. G is an eccentric wrist-pin on the end of the shaft B, and which enters a sliding block, H, that has its motion in the groove *e*. I is a crank-arm, secured on the comb-shaft C by a set-screw, *c*, and provided with a wrist, *i*, which fits in the groove *f*. K and L are bearing-blocks, secured on the shaft D and to each other by screws *l l*, by means of which said blocks may be adjusted toward each other to take up wear of shaft D in blocks K L, the horizontal faces of said blocks being some distance apart, as shown in Fig. 7, when applied to said shaft D. *k* is a standard on the block K, threaded for the reception of a screw-spindle, M, which passes through said standard and has its bearings beneath the lid A, as shown, at *m m*. By turning the spindle M the shaft D may be moved so as to recede from the shaft B and approach the shaft C, and vice versa, the effect being to increase or to decrease the rocking motion of said shaft C according to the direction of such movement.

When the shaft B is rotated the block H is slid to and fro in the groove *e*, the shaft D being thereby rocked. As the wrist-pin *i* of the crank I attached to the shaft C occupies the groove *f*, said shaft C rocks with the shaft D, thereby giving the desired motion to the doffer-comb N, which is sustained on arms *n n* projecting from said shaft C; but this motion of the shaft C will only occur when the wrist *i* is out of center with the shaft D, for if said shaft D and wrist *i* be on the same center no motion will be communicated to the shaft C. So, too, to increase the extent of motion of the shaft C, the shaft D, through the medium of the blocks K L and spindle M, must be moved out of center with the wrist *i*, and the farther it is so moved the greater will be the motion of said shaft C and of the comb N.

To return to the box A the oil which finds its way out along the shafts B and C, channels *a a* are made in the sides of said box, as shown. The comb-shaft C may be so adjusted in the eye *i'* of the crank-arm I, by means of the set-screw *c*, as to bring the arms *n n* into perpendicular, in order to more easily clean the comb N.

It is obvious that the standard *k* is not an essential element of the combination between the blocks and the shaft, as the standard may be dispensed with and the connection made directly with the blocks or with any desirable equivalent of the standard.

What we claim as our invention is—

1. The shaft D, having heads E and F, grooved at *e* and *f*, substantially as shown and described.

2. In combination with the shaft B, having wrist G, the shaft C, having crank-arm I and wrist *i*, and shaft D, having grooved heads E and F, substantially as shown and described.

3. In combination with the shaft D, the blocks K L and the screw-spindle M, connected, substantially as described, for adjusting said shaft D relatively to the shafts C and B, substantially as shown and described.

4. In combination with the driving-shaft B and a shaft, C, deriving a rocking motion therefrom when said driving-shaft is rotated, an intermediate shaft, D, and mechanism, substantially as described, for adjusting the same between said shafts B and C, whereby the extent of motion of the latter may be varied, substantially as and for the purpose set forth.

5. In combination with the shaft D, the bearing-blocks K L, fastened thereon and to each other by adjusting-screws *l l*, substantially as shown and described.

In testimony that we claim the foregoing we have hereunto set our hands this 2d day of April, 1878.

FRANCIS G. BATES.
LOUIS E. HARTMANN.

Witnesses:
SAML. J. VAN STAVOREN,
GEO. C. SHELMERDINE.